UNITED STATES PATENT OFFICE.

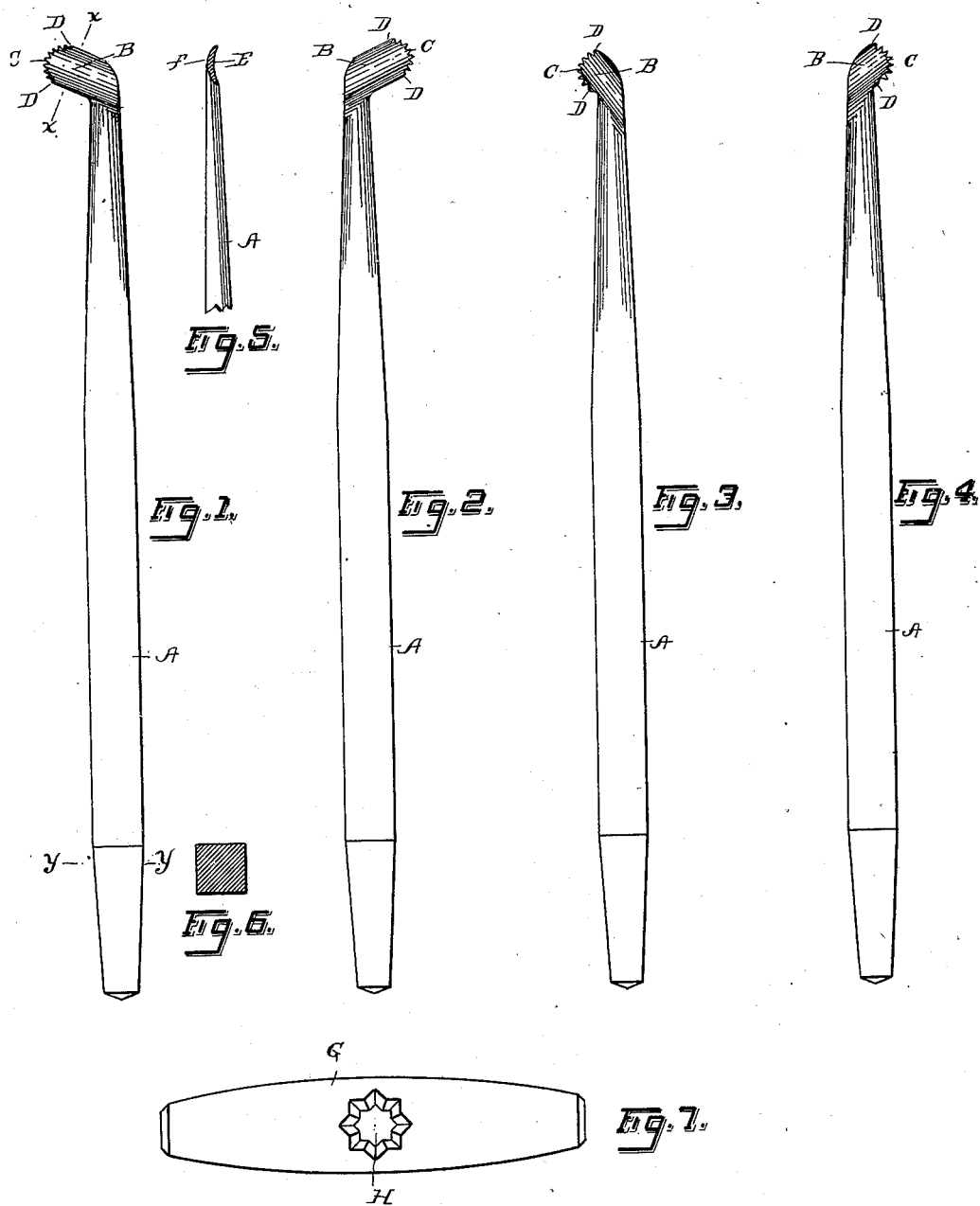

XAVER DÓDEL, OF SAN FRANCISCO, CALIFORNIA.

DENTAL ELEVATOR.

SPECIFICATION forming part of Letters Patent No. 663,068, dated December 4, 1900.

Application filed February 11, 1898. Renewed May 8, 1900. Serial No. 15,948. (No model.)

*To all whom it may concern:*

Be it known that I, XAVER DÓDEL, a subject of the German Emperor, residing at San Francisco, in the county of San Francisco and State of California, have invented certain new and useful Improvements in Dental Elevators; and I do hereby declare the following to be a full, clear, and exact description of said invention, such as will enable others skilled in the art to which it most nearly appertains to make, use, and practice the same.

My invention relates to improvements in dental instruments, and more particularly to that class of such instruments known as "dental elevators" or "stump-extractors," my object being primarily to provide such a device that the tooth or stump can be readily extracted, while the pain attendant upon such an operation is reduced to the minimum.

To this end, and also to improve generally upon devices of the nature indicated my invention consists in the various matters hereinafter described and claimed.

In the accompanying drawings, Figures 1 and 2 are front elevations of the right and left hand tools which are used for raising a root previously loosened. Figs. 3 and 4 are similar views of corresponding tools for starting or extracting the root from its socket. Fig. 5 is a fragmentary side view showing the operative end in section on the line $x\,x$ of Fig. 1. Fig. 6 is a cross-sectional view of the shank on the line $y\,y$ of Fig. 1, and Fig. 7 is a view of the handle in which the shanks are set when in use.

The instruments are constructed in what are termed "rights" and "lefts," and as such terms are well understood no further explanation will here be given nor will the difference be again referred to.

Referring now more particularly to the drawings, A represents the tool-shank, and this is provided at one end with an extension B, which projects from the shank at an angle greater than ninety degrees, preferably about one hundred and twelve degrees. This extension is concavo-convex, as shown in Fig. 5, the concave face being represented by E and the convex back face by F, said latter face being rounded to meet the concave face E. The end of the extension is outwardly rounded and has smooth corners D, between which are sharpened serrations or teeth C.

In use the angular extension B is inserted between the proper teeth of the patient, the tooth or root lying against the concave face E. The angular projection of the extension previously indicated permits the operator's hand to lie above or below the tooth-line, and the meeting-point between the extension and the shank forms a natural point of leverage. The instrument being positioned as described, by properly turning the hand in a well-known manner the serrations engage the root and the same is lifted.

The form of tool shown in Figs. 3 and 4 is designed for use in starting a root and differs from the tool shown in Figs. 1 and 2 in having a comparatively short extension B. The form of tool shown in Figs. 1 and 2 is designed for use after the root has been started.

It is to be noted that in the tool as above described the smooth corners D permit the same to be inserted without undue laceration of the gum or bone, said corners pushing the gum away from the teeth, while the outwardly-rounded serrated end formed upon the concavo-convex extension permits the root to be firmly engaged at many points upon its side, said root lying not merely at one point against the tool, but resting in the concavity and against the face E. In its use the present instrument has been found to effectively perform its work and to greatly reduce the amount of pain incident upon such operations, the laceration being comparatively slight and the closely-fitting concavo-convex extension, with its outwardly-rounded serrated edge, firmly engaging the root.

As shown in Fig. 6, the end of the tool-shank is polygonal—*i. e.*, it is not round—and the handle G (shown in Fig. 7) is provided with an opening or socket H of a cross-section corresponding to the figure formed by superposed plates, each corresponding to the cross-section of the polygonal tool-shank, the edges of the plates thus superposed not coinciding. This permits the insertion of the shank into the socket at various angles. For example, the particular shank here shown is square and the socket-opening corresponds to two square plates with their edges not coincident, or, in other words, an eight-pointed star. Thus the particular shank here shown can be inserted in the handle so that the projecting tooth-engaging member can assume eight different angles with relation to said handle. This has been found to be very convenient in that it permits the operator to insert the tool with reference to the most convenient angle for holding or drawing it over in the prying action.

Having thus described my invention, what I claim as new, and desire to secure by Letters Patent, is—

A handle for use upon tools having polygonal shanks, said handle having a socket corresponding in cross-section to the figure formed by a plurality of superposed plates with their edges not coincident, each of said plates corresponding to the cross-section of the said polygonal tool-shank; substantially as described.

In testimony whereof I have hereunto set my hand this 31st day of January, 1898.

XAVER DÖDEL.

Witnesses:
J. H. KUSER,
HANS DODEL.